United States Patent [19]
McNaney

[11] 3,985,426
[45] Oct. 12, 1976

[54] LIGHT BEAM DEFLECTION RESOLUTION AMPLIFIER MEANS

[76] Inventor: Joseph T. McNaney, 8548 Boulder Drive, La Mesa, Calif. 92041

[22] Filed: July 7, 1975

[21] Appl. No.: 593,874

[52] U.S. Cl. ............................ 350/160 R; 332/7.51; 340/173 LM
[51] Int. Cl.² ............................................. G02B 5/23
[58] Field of Search ............. 350/96 WG, 160, 161, 350/162; 356/112; 332/7.51; 340/173 LM.

[56] References Cited
UNITED STATES PATENTS

| | | | |
|---|---|---|---|
| 3,498,693 | 3/1970 | Fein et al. ............................ | 350/160 |
| 3,506,334 | 4/1970 | Korpel ................................ | 350/162 |
| 3,923,380 | 12/1975 | Hattori et al. ...................... | 332/7.51 |

*Primary Examiner*—David C. Nelms

[57] ABSTRACT

The invention includes light optic means which functions as a secondary light beam deflector, or distributor, in making available a series of arrays of information bearing light beams, from a primary light beam deflector, at a series of secondary display positions for the purpose of extending the resolution and deflection capabilities many times beyond the practical limits of the primary light beam deflector.

2 Claims, 6 Drawing Figures

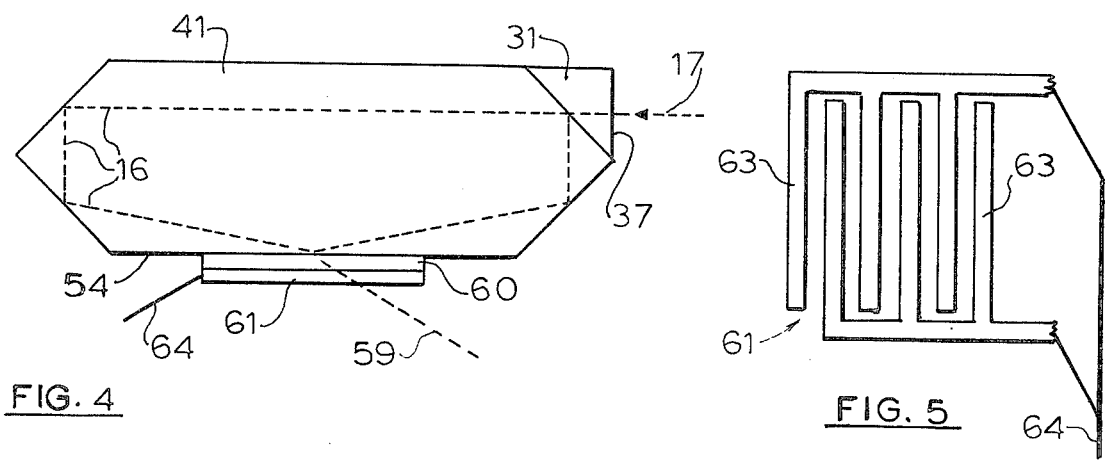
FIG. 4
FIG. 5
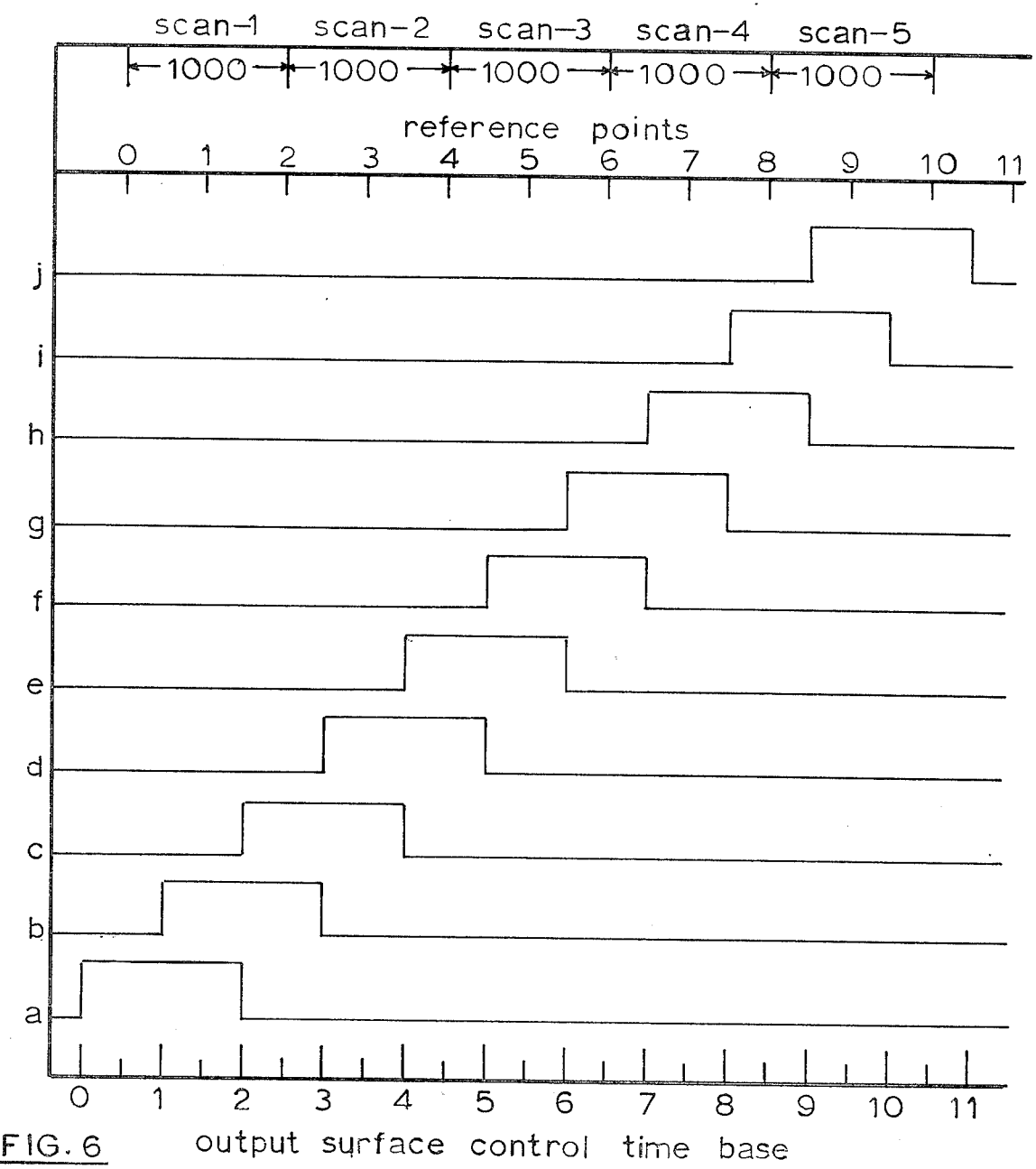
FIG. 6   output surface control time base

LIGHT BEAM DEFLECTION RESOLUTION AMPLIFIER MEANS

BACKGROUND OF THE INVENTION

The invention herein relates to light optic data handling systems which utilizes the concept, as set forth in my U.S. Pat. No. 3,872,451, of directing a beam of light by means of an array of at least three light reflecting surfaces along a primary optical path in the form of a spiral of plural revolutions. At a predetermined location along each revolution the beam of light will be made available for a redirecting of light therefrom along a corresponding one of a plurality of secondary paths stemming, respectively, from said locations, each location representative of an output position of said system. Electro optic material light reflection control means are included at each output position for effecting, selectively, a frustating of light reflections and thereupon redirecting light away from a selected one of said output positions.

In a co-pending application Ser. No. 566,916 filed Apr. 10, 1975, a further embodiment of an electro optic material light reflection control means is disclosed including the use of a layer of electro optic material in combination with an interdigital electrode assembly joined to the surface thereof at each output position. In response to a d.c. voltage between first and second electrodes of the assembly periodic strains are established in the layer of material and resulting periodic variations of index of refraction therein are utilized in the controlling and redirecting of light along a secondary path stemming from a selected one of a plurality of output positions.

In another co-pending application Ser. No. 580,586 filed May 27, 1975, the material coincident with the light reflection control interface at each output position exhibits piezoelectric effects in response to the influence of an electric field. Interdigital electrode assemblies are supported closely adjacent the interface at each output position and in response to a d.c. voltage between the electrodes of a given assembly the resulting periodic strains in the piezoelectric material, followed by a spatial change in the index of refraction of materials coincident with the interface thereof, effects a redirecting of light away from a corresponding one of the output positions.

In still another co-pending application Ser. No. 590,105 filed June 15, 1975, the concept set forth in the above noted U.S. Pat. No. 3,872,451 is again utilized, but in combination with an initial beam positioning means for allowing a single source beam of light to be directed along a plurality of individual input paths to the system, forming, for example, 7 × 9 arrays of beams from which message characters may be formed and presented to the system. It is also an object of the invention to extend the beam deflection and resolution capabilities beyond the practical limits of those of present day beam positioning system means.

Herein the light beam reflection control concept of the above noted U.S. Pat. No. 3,872,451 is again included in a system means for extending beam deflection and resolution capabilities of present state of the art systems. Unlike the foregoing co-pending applications, however, the invention herein includes the use of acoustic wave generating means coincident with each of the output positions of the system for propagating an acoustic wave in the light conducting media at each such light reflection control position for controlling, selectively, the redirecting of light along secondary paths stemming from corresponding output positions.

SUMMARY OF THE INVENTION

Information bearing light beams are directed along a number of individually spaced light beam paths, by means of a primary beam deflecting or positioning means, toward a light admitting surface of the secondary light beam deflector, or distributor. Upon entering the distributor each beam of an array is directed along a primary optical path therein stemming, respectively, from each of the individual input paths. In following a primary path each beam of an array undergoes a series of light reflections for the purpose of making available light thereof at any of a number of light output positions of the distributor. Utilizing electrical control means at each of the output positions light from each array is directed along secondary paths beyond the limits of the distributor for use in communications, data recording, data control, etc. It is therefore an object of the invention to extend the resolution and deflection capabilities far beyond those of present day acousto-optic, electro-optic and other beam positioning means.

The invention is illustrated, by way of example only, in the accompanying drawings and the description which follows when read in connection with the drawings will provide a better understanding of the objectives and other advantages of the invention.

BRIEF DESCRIPTION OF THE DRAWINGS

FIG. 4 in combination with FIG. 5 illustrates still further embodiments of the invention; and FIG. 6 is a time base chart which will be referred to in the description of the above embodiments.

DESCRIPTION OF THE INVENTION

Figure 1:
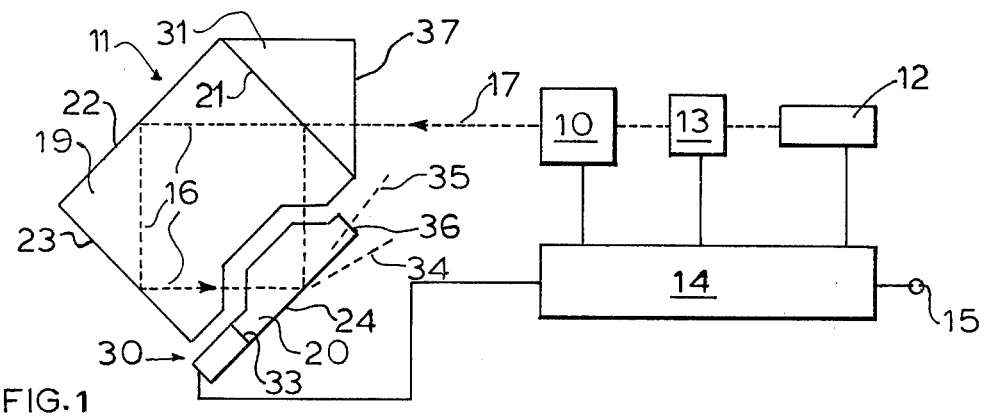
FIGS. 1 and 2 are first and second diagrammatic presentations of a system embodiment of the invention.
Figure 2:
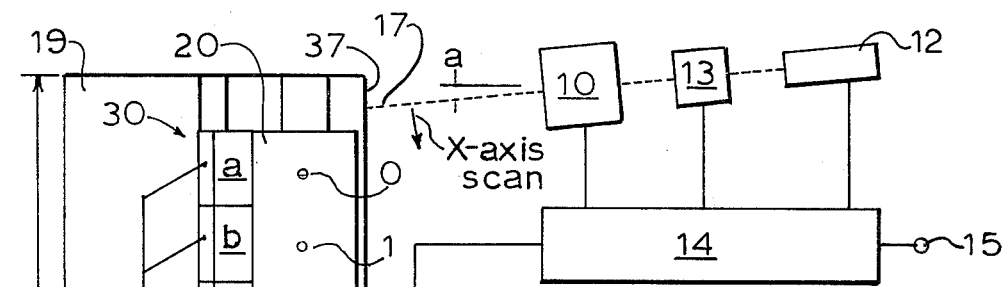

Referring now to FIGS. 1 and 2, one embodiment of the invention hereof is illustrated, for example, as including a first light beam deflection means, or beam positioner, 10 and a second light beam deflection means, or distributor, 11. The first beam positioning means 10 is a block diagram illustration of an acousto-optic device, for example, shown in the optical path of light from a laser source 12 and a light beam modulator 13, each of which are of the type well known in the industry. In response to signals from control logic circuitry 14, and signals applied to an input terminal 15, the modulator 13 will control the intensity of the light from source 12 and the device 10 will control the deflection of the light beam in, for example, an X-axis mode.

The distributor 11 is illustrated as including, for example, first and second members, 19 and 20, of light conducting material each presenting a predetermined index of refraction and having length dimensions L. Closely adjacent to one side 21 of member 19, and at one end thereof, there is shown a prism 31 preferably of a material like that of the member 19. Light from the source 12 may be understood as being directed along an initial path 17 and at an angle in relation to member 19 as indicated in FIG. 2. Of course, all dimensions of the illustrations are exaggerated so as to simplify the descriptions of the invention. Upon entry of a light beam to the member 19 it will be directed along a path therein, to be referred to as the primary optical path 16, by means of light reflecting surfaces, or the interfaces of first and second light conducting material, 22, 23, 24, and again by surfaces 21, 22, 23, 24, 21, and so on, spiralling its way through the length dimension of the members 19 and 20, thereby following a series of 360° optical paths each displaced one with respect to the other in a side-by-side relationship therein. In doing so the beam will appear at a series of deflection points along the deflection surface 24 of member 20 in the direction of its length dimension. The angular relationship of the reflecting surfaces 21, 22, 23 and 24, or additional surfaces when necessary, will have been established so as to provide a required angle of incidence of the light beams upon the reflecting surface 24.

Included in the series of deflection points along the surface 24 at which light beams will appear are reference points 0 through 9 as indicated in FIG. 2, which are again shown in the chart of FIG. 6. And opposite each one of these points along the surface 24 there is a piezoelectric transducer 30, each of which are attached to a surface 33 of the member 20 and electrically connected to a signal source in the circuitry 14. Upon the extending of the influence of a voltage thereto each transducer 30 is designed to generate acoustic waves in that portion of member 20 to which it is joined and establish periodic strains at the interface of the surface 24 and air adjacent thereto, effecting a diffraction grating thereat as exemplified in FIG. 2, opposite transducers g, h and i.

In spiralling its way through the length of members 19 and 20 the light beam undergoes a series of reflections until it reaches the opposite end thereof. However, upon the effecting of a diffraction grating as indicated opposite any of the transducers 30 an otherwise normal light reflection thereat will be frustrated and thereupon directed through the interface and beyond the limits thereof and along a secondary path 34. Or an otherwise normal reflection of light may be altered so as to be deflected at an angle allowing light to be directed along a path 35 through an opposite surface 36 of the member 20. In such manner light may be directed along any of a large number of secondary paths stemming from positions along the length of the member 20. Light available at these positions may be used in communications, data handling, etc.

High quality recording of information bearing light beams is an object of the invention. A record medium may be moved in a Y-axis relationship to the light output of the distributor 11. A line array of information bearing light beams will be directed along a series of input paths, stemming from the deflector means 10, toward the input surface 37 of the prism 31. The deflector means 10 can be of a type providing 1000 elements per line scan extending from the initial path position 17 in the direction of the length dimension of the surface 37, which will be referred to as the X-axis scan. An object of the invention, as indicated, is to extend the resolution capabilities many times beyond those of the deflector 10. Illustratively, the invention will be described as utilizing a 1000 element per line resolution deflector 10 directing light therefrom along any of a possible 1000 input paths toward the surface 37. Referring to FIG. 2, the initial path 17 will represent path number one of the 1000 paths and a light beam thereon will be deflected along a primary path 16 and made available at an output position 0 of the surface 24. A light beam on an input path five hundred will be made available at an output position 1. And a light beam on an input path ten hundred will be made available at an output position 2. In FIG. 6, the output positions are identified as being reference points 0 – 1 – 2, shown on the line below, what will be referred to as, scan-1 and the 1000 input paths.

In the absence of an energizing voltage to any of the transducers identified as $a$ through $j$, light from each of the 1000 paths will be deflected within the distributor 11 until it reaches the end 38 thereof. Upon the application of a voltage to transducers $a$ and $b$, light will be directed along 1000 individual output paths extending from the reference point 0 to the reference point 2. An output surface control time base is included in the chart of FIG. 6, showing the period of time each transducer, $a$, $b$, $c$, $d$, etc., will be turned ON and OFF so as to permit light from the input paths of scan-1, followed by scan-2, scan-3, etc., to be directed along output paths stemming from the distributor 11. It may be noted from the chart, by the time scan-1 has been completed, and at the start of scan-2, the transducer $a$ will have been turned OFF and transducer $c$ will have been turned ON. About midway of the first half of scan-2 the transducer $b$ will have been turned OFF and transducer $d$ will have been turned ON. Then about midway of the second half of scan-2 the transducer $c$ will have been turned OFF and the transducer $e$ will have been turned ON. This sequence of events thus far will have established deflection control conditions within the distributor 11 whereby information bearing beams of a second scanning of surface 37, or referred to as scan-2 on the chart, will be deflected as they appear between reference points 0 and 2, but frustrated as they arrive between reference points 2 and 4, allowing the light beams of scan-2 to be directed along a series of individual output paths extending from the reference points 2 and 4. The system of turning ON and OFF of the distributor transducers, as shown in the chart, will continue until scan-3, scan-4, etc., have been completed. In doing so one line of information will have been recorded on the record medium. Succeeding lines of information will be recorded in a manner set forth in the recording of the initial line until the recording of the message has been completed.

Instead of providing but a single transducer in connection with the output deflection control of light beams for each line scan of 1000 input elements incident upon surface 37, as opposed to using more than a single transducer described herein, it is an object of the invention to divide an otherwise individual transducer effect into at least two overlapping light reflection control functions which serve as a means of avoiding a requirement of otherwise close tolerances in the fabrication of the resolution amplifier means of this invention. For example, it would be somewhat impractical to attempt to establish a series of diffraction gratings along the surface 24, using a series of 1000 individual light beams incident upon the surface 37, so as to have the positioning of each grating, and the length dimension thereof, coincide precisely with the positioning of 1000 beams along the surface 24, and the dimension between the first and last element of the 1000 beams. The overlapping of the light deflection control functions as set forth herein is a practical means of solving the fabrication problem of such a system.

Figure 3:
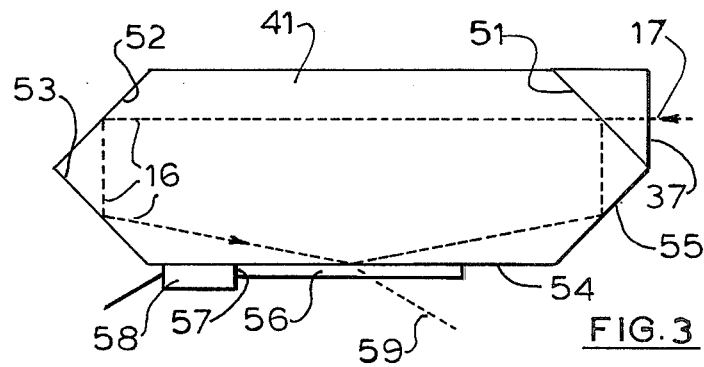
FIG. 3 illustrates a further embodiment of the invention.

A further embodiment of the invention, shown in FIG. 3, will include a layer of light conducting material 56 intimately joined to the surface 54 of a member 41 of light conducting material, and an index of refraction lower than that of the member 41. Instead of a system of four reflecting surfaces, as in the case of the illustration of FIG. 1, the member 41 is provided with a system of five such surfaces 51, 52, 53, 54 and 55, offering a greater choice in providing the angle of light incident upon the reflection control surface 54. A piezoelectric transducer means 58 joined to an end surface 57 of the layer 56 for establishing diffraction gratings therein along a length dimension thereof for effecting light reflection control at the interface of the materials 41 and 56. In operation, the light reflection control functions will be performed in a manner such as that described in the first embodiment, providing a redirecting of light beyond the limits thereof along a series of output paths 59.

It should be understood by those skilled in the arts pertaining to the construction and application possibilities of the invention herein set forth that the embodiments included herein illustrate in a very limited sense the usefulness of the invention, and that the invention includes such other modifications and equivalents as they may be seen by those skilled in the arts, but still being within the scope of the appended claims.

I claim:

1. A light beam position control system comprising:
   a. a source of light and means for directing an individual beam of light therefrom along a primary optical path within said system so as to establish an availability of light of said beam at a plurality of predetermined locations along said path for a redirecting of said light from a selected one of said locations to, and along, a corresponding one of a plurality of secondary optical paths stemming, respectively, from said locations, each said location representative of an output position of said system;
   b. said means including an array of at least three light reflecting interfaces of first and second light conducting media presenting, respectively, first and second indices of refraction and each interface presenting a length dimension, said array of interfaces each angularly oriented so as to establish an optical relationship one with respect to the other for allowing said beam of light to be directed along said primary path forming a helix of plural revolutions, each revolution including at least one of said predetermined locations representative of an output position at which light will be made available for said redirecting thereof along a corresponding secondary path, each said output position coinciding with, and extending along the length dimension of, at least one interface of said array of interfaces of first and second light conducting media;
   c. a plurality of acoustic wave generator means;
   d. a source of electrical signals for driving said acoustic wave generator means and control circuitry means for extending, selectively, the influence of said electrical signals to said generator means;
   e. each said generator means operatively associated with said media of said one interface adjacent, respectively, each of said output positions;
   f. means for allowing said beam of light to be directed along said helix of plural revolutions in the absence of said influence to any of said plural generator means;
   g. means for limiting the redirecting of light selectively from but one of said output positions at any one time, said last stated means including the extending of said influence to an acoustic wave generator means adjacent a selected one of said output positions for propagating an acoustic wave in at least one of said first and second media coinciding with said selected output position and for thereby establishing a diffraction grating in said one medium for effecting said redirecting of light along a secondary path stemming from said selected one of said output positions.

2. A light beam position contol system comprising:
   a. a source of light and means for directing an individual beam of light therefrom along a primary optical path within said system so as to establish an availability of light of said beam at a plurality of predetermined locations along said path for a redirecting of light from a selected one of said locations to, and along, a corresponding one of a plurality of secondary optical paths stemming, respectively, from said locations, each said location representative of an output position of said system;
   b. said means including an array of at least three light reflecting surfaces, each surface presenting a length dimension and each surface positioned substantially parallel one with respect to the other in said array, the surfaces of said array each angularly oriented so as to establish an optical relationship one with respect to the other for allowing said beam of light to be directed along said primary path forming a helix of plural revolutions, each revolution including at least one of said predetermined locations representative of an output position at which light will be made available for said redirecting thereof along a corresponding secondary path;
   c. first and second light conducting media intimately joined to one another and thereby providing a light reflecting interface thereof, said interface extending along said length dimension and representative of at least one of the light reflecting surfaces of said array of surfaces, each of said output positions coinciding with, and extending along the length dimension of, said interface of the first and second light conducting media;
   d. a plurality of acoustic wave generator means;
   e. a source of electrical signals for driving said acoustic wave generator means and control circuitry means for extending, selectively, the influence of said electrical signals to said generator means;
   f. each of said generator means operatively associated with the media of said light reflecting interface adjacent, respectively, each of said output positions;
   g. means for allowing said beam of light to be directed along said helix of plural revolutions in the absence of said influence to any of said plural generator means;
   h. means for limiting the redirecting of light, selectively, from but one of said output positions at any one time, said last stated means including the extending of said influence to an acoustic wave generator means adjacent a selected one of said output positions for effecting the propagating of an acoustic wave in at least one of said first and second media coinciding with said selected one of the output positions and for thereby establishing a diffraction grating in said medium for effecting said redirecting of light along a secondary path stemming from said selected one of said output positions.

* * * * *